United States Patent
Popov

(10) Patent No.: US 6,348,134 B1
(45) Date of Patent: *Feb. 19, 2002

(54) PLANT FOR THE DISTILLATION OF A LIQUID PRODUCT

(75) Inventor: Serguei A. Popov, H-1213, Maria Kiralyne ut., 54 Budapest (HU)

(73) Assignees: Evgueni D. Petroukhine, Limmasol (CY); Serguei A. Popov, Budapest (HU)

( * ) Notice: Subject to any disclaimer, the term of this patent is extended or adjusted under 35 U.S.C. 154(b) by 0 days.

This patent is subject to a terminal disclaimer.

(21) Appl. No.: 09/171,161

(22) PCT Filed: Feb. 13, 1998

(86) PCT No.: PCT/RU98/00033

§ 371 Date: Oct. 14, 1998

§ 102(e) Date: Oct. 14, 1998

(87) PCT Pub. No.: WO98/35736

PCT Pub. Date: Aug. 20, 1998

(30) Foreign Application Priority Data

Feb. 14, 1997 (RU) ............................................. 97102294

(51) Int. Cl.⁷ ............................... B01D 3/10; C10G 7/06
(52) U.S. Cl. ........................ 196/114; 196/140; 202/186; 202/205; 202/185.2; 203/87; 203/DIG. 14; 203/91; 208/357; 208/366
(58) Field of Search ........................... 196/98, 114, 127, 196/138, 140; 208/350, 369, 366, 357; 202/186, 185.2, 205, 197, 202; 203/87, 91, 99, DIG. 14, DIG. 19; 159/DIG. 16, DIG. 40

(56) References Cited

U.S. PATENT DOCUMENTS 1,567,429 A * 12/1925 Earl et al. ................... 208/361

(List continued on next page.)

FOREIGN PATENT DOCUMENTS

| JP | 63296801 | * 12/1988 |
| RU | 2048156 | 11/1995 |
| SU | 724149 | 3/1980 |
| SU | 1648961 | 5/1991 |
| WO | 96/05900 | 2/1996 |
| WO | 96/16711 | 6/1996 |

*Primary Examiner*—Virginia Manoharan
(74) *Attorney, Agent, or Firm*—Mark A. Oathout

(57) ABSTRACT

The invention pertains to the field of oil refining and the petrochemical industry. The proposed plant for the distillation of a liquid has a vacuum rectification column with pipes for feed of a stock product and for bleeding of a gas-vapor phase and at least one liquid fraction; and a vacuum-producing device composed of a liquid-gas jet apparatus, a separator, a pump and a condenser. The gas intake of the liquid-gas jet apparatus is connected to the pipeline for bleeding of a gas-vapor phase, the liquid intake of the jet apparatus is connected to the discharge side of the pump and the outlet of the jet apparatus is connected to the condenser's intake. The intake of the separator is connected to the condenser's outlet, the liquid outlet of the separator is connected to the suction side of the pump and the gas outlet of the separator is connected to consumers of compressed gas. There is a variant of the invention wherein the condenser is furnished with an additional liquid intake, which is connected to the discharge side of the pump. Another variant of the invention is when the condenser is connected to the pipeline for bleeding of a liquid fraction from the rectification column. In all variants of the invention the pipeline for bleeding of a liquid fraction is connected to the suction side of the pump and the condenser can be furnished with a hydro seal. Application of the invention increases efficiency of oil processing and decreases destructive environmental impacts.

16 Claims, 1 Drawing Sheet

U.S. PATENT DOCUMENTS

| | | | | |
|---|---|---|---|---|
| 2,105,935 A | * | 1/1938 | Swanson | 196/73 |
| 2,680,709 A | | 6/1954 | Skinner | |
| 3,505,176 A | * | 4/1970 | Buchsbaum | 203/73 |
| 3,579,307 A | * | 5/1971 | Wakita et al. | 422/131 |
| 4,292,140 A | * | 9/1981 | Kawasaki et al. | 203/22 |
| 5,935,388 A | * | 8/1999 | Meszaros | 203/DIG. 8 |
| 5,980,698 A | * | 11/1999 | Abrosimov et al. | 196/114 |
| 6,086,721 A | * | 7/2000 | Tsegelsky | 203/DIG. 14 |

* cited by examiner

PLANT FOR THE DISTILLATION OF A LIQUID PRODUCT

BACKGROUND

This invention pertains to the field of oil refining and the petrochemical industry, and more particularly to installations for the vacuum distillation of liquids, such as crude oil for instance. The invention can be used for the rectification of an oil stock. Additionally, the invention relates to the field of environmental protection from pestiferous industrial waste since there is no discharge of water-oil emulsion, which is an ordinary oil refining waste, when the invention is used for the rectification of oil.

An installation for the distillation of crude oil is known, which has a vacuum rectification column and a steam ejector maintaining a reduced pressure in the column (see U.S. Pat. No. 2,680,709, cl. 202–204, 1954).

Water condensate contaminated with oil products is generated during operation of this installation. Such water condensate has to pass special depuration before it is discharged into industrial drainage. Depuration of the wastewater containing water-oil emulsion (mixture of steam condensate and liquid hydrocarbons) is very expensive. At the present time, there are not any sufficiently inexpensive and productive means for effective depuration of the waste water of oil refineries.

A plant for distilling liquid products disclosed in RU patent No. 2048156, M cl., B OI D Mar. 10, 1995, has been chosen as the starting point for the invention. The plant has a vacuum rectification column with pipes for feed of a stock product and for bleeding of a gas-vapor phase and a liquid fraction. Further, the plant has a vacuum-producing device composed of a liquid-gas jet apparatus, a separator and a pump.

During operation of the RU '156 plant the gas-vapor phase is evacuated from the rectification column by the liquid-gas jet apparatus. The liquid fraction from the rectification column is used as an active medium for the liquid-gas jet apparatus. Such provides a reduced negative environmental discharge of waste substances (water-oil emulsion).

One imperfection of the RU '156 plant is the unstable operation of the separator conducing to recurring emission of gases and to consequential loss in the base product output. Said emissions of the gaseous phase from the separator take place due to incomplete condensation of the gas-vapor phase during its mixing with the active liquid in the jet apparatus. These emissions disturb the dynamic balance between the elements of the vacuum system and result in periodic overloading of the separator.

SUMMARY OF THE INVENTION

The objective of the present invention is to increase the efficiency of the distillation plant and to increase output of the base products due to complete condensation of easy-condensable components of the gas-vapor phase during mixing of the gas-vapor phase with the active liquid in the jet apparatus. This allows one to reduce loading of the separator, to make the operation of the separator more stable and to prevent the emission of the non-condensed components of the gaseous phase.

The stated objective is achieved because the vacuum-producing device composed of a liquid-gas jet apparatus, a separator and a pump, which is a part of the distillation plant having the vacuum-producing device and a vacuum rectification column with pipes for feed of a stock product, and for bleed of a gas-vapor phase and at least one liquid fraction, is furnished with a condenser. The gas intake of the liquid-gas jet apparatus communicates with the pipeline for bleed of a gas-vapor phase, the liquid intake of the liquid-gas jet apparatus is connected to the discharge side of the pump and the outlet of the liquid-gas jet apparatus is connected to the condenser's intake. The intake of the separator is connected to the condenser's outlet, the liquid outlet of the separator is connected to the suction side of the pump and the gas outlet of the separator is connected to consumers of compressed gas. There is a variant of the plant wherein the condenser has an additional liquid intake, which is connected to the discharge side of the pump. Another variant is when the condenser is connected to the pipeline for bleed of a liquid fraction from the rectification column.

In all of the introduced variants of the plant, it is preferable to connect the pipeline for bleeding of a liquid fraction to the suction side of the pump and to provide the condenser with a hydro seal.

When the condenser is placed upstream of the separator's intake it is possible to arrange an adjustable and controlled process of condensation of easy-condensable components of the stock product in the active liquid medium of the jet apparatus. The specific location of the condenser in the vacuum-producing device has great significance. It is expedient to locate the condenser nearer to the separator when there is no additional supply of the active liquid into the condenser. This allows, on the one hand, a reduction of hydraulic losses in the pipeline between the jet apparatus and condenser because a liquid-gas mixture runs inside such pipeline, and, on the other hand, feeding of the separator by a more homogeneous medium with a lower content of the gaseous phase. In case there is a necessity to feed the condenser with an additional liquid medium in order to intensify condensation of easy-condensable components, it is expedient to locate the condenser nearer to the jet apparatus.

Either the liquid fraction from the rectification column or the active liquid from the discharge side of the pump can be used as the additional liquid for the condenser. Of the two, the most preferable is the liquid fraction from the rectification column. Input of the liquid fraction from the rectification column ensures renewal of the active liquid and stimulates condensation of easy-condensable components of the gas-vapor phase. Additionally, feed of the liquid fraction into the condenser reduces hydraulic losses during mixing with the active liquid and also provides for a more effective compression of non-condensable components of the gas-vapor phase. Consequently, pressure goes up in the manifold supplying compressed gas to consumers while energy consumption of the vacuum-producing device remains the same.

It is necessary to note that, besides more intensive gas separation, a decrease in pressure in the separator may cause the disturbance of a hydrodynamic balance between the condenser and the jet apparatus and deteriorated condensation of easy-condensable components in the active liquid. The availability of a hydro seal in the condenser hydraulically isolates the condenser and the separator. As a result, it is possible to extend the range of working pressures of the jet apparatus, condenser and separator, and to increase operational reliability and stability of the vacuum-producing device. All of this increases the efficiency of the distillation plant.

DETAILED DESCRIPTION

Figure 1:
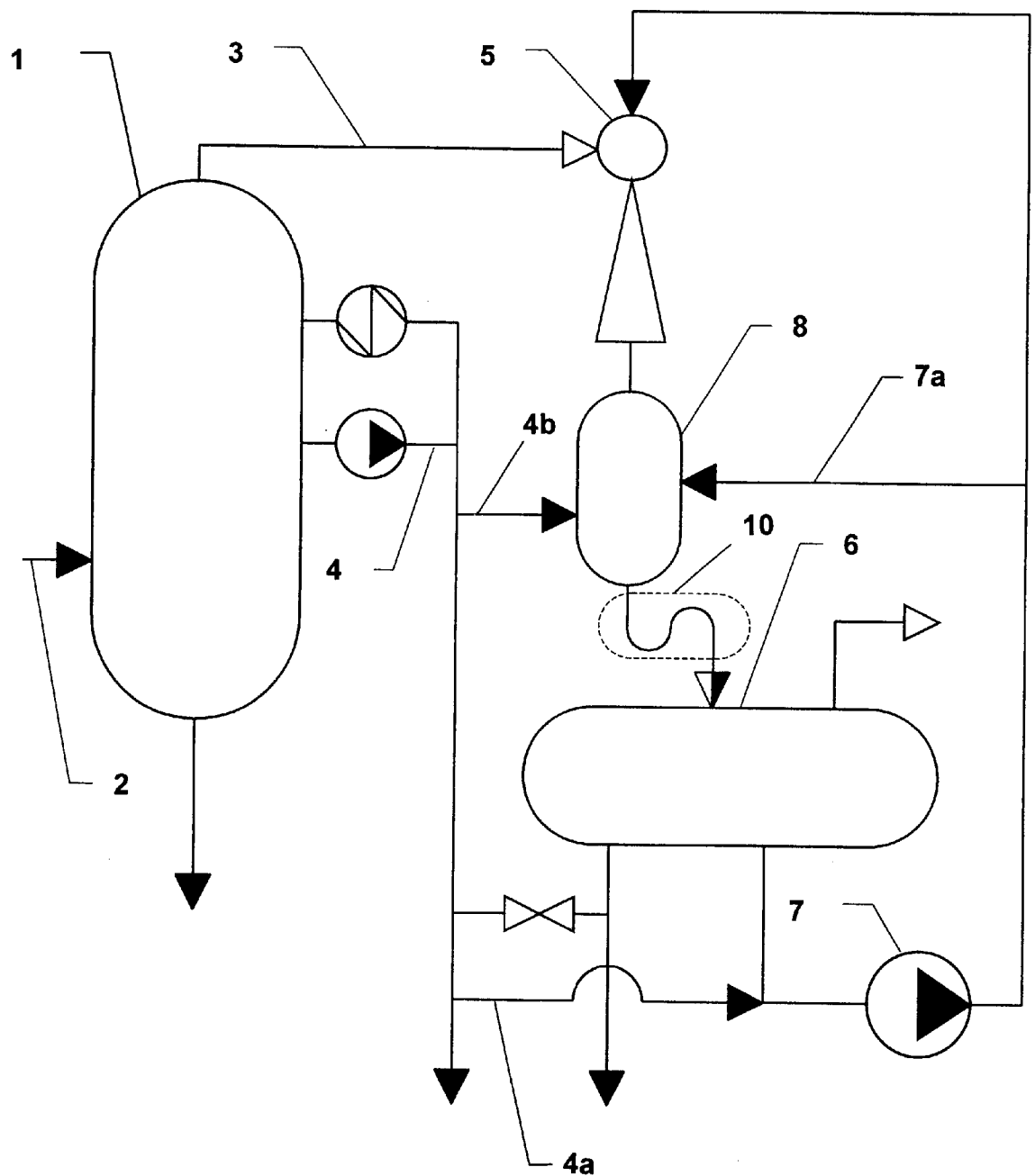
FIG. 1 schematically represents the described plant for the distillation of a liquid product.

The plant for the distillation of a liquid product has a vacuum rectification column 1 and a vacuum-producing device composed of a liquid-gas jet apparatus 5, a separator 6, a pump 7 and a condenser 8. The column 1 has a pipeline 2 for feed of a stock product, a pipeline 3 for bleeding of a gas-vapor phase and a pipeline 4 for bleeding of a liquid fraction. The gas intake of the liquid-gas jet apparatus 5 is connected to the pipeline 3 for bleeding of a gas-vapor phase, the liquid intake of the liquid-gas jet apparatus 5 is connected to the discharge side of the pump 7 and the outlet of the liquid-gas jet apparatus 5 is connected to the intake of the condenser 8. The intake of the separator 6 is connected to the outlet of the condenser 8, the liquid outlet of the separator 6 is connected to the suction side of the pump 7 and the gas outlet of the separator 6 is connected to consumers of compressed gas.

There is a variant of the plant wherein the pipeline 4 for bleeding of a liquid fraction from the rectification column 1 is connected to the suction side of the pump 7 via pipeline 4a and to the condenser 8. In this case the condenser 8 represents a condenser-mixer with a hydro seal 10 and an additional liquid intake connected either to the discharge side of the pump 7 via line 7a or to the pipeline 4 via line 4b. The other intake and outlet of the condenser are, respectively, connected to the outlet of the jet apparatus 5 and to the intake of the separator 6.

The distillation plant works as follows:

A stock product is fed through the pipeline 2 into the vacuum rectification column 1, where it is distillated into a gas-vapor phase and at least one liquid fraction. The gas-vapor phase is evacuated from the column 1 through the pipeline 3 by the liquid-gas jet apparatus 5. The liquid fraction proceeds into the pipeline 4. A liquid phase from the separator is delivered by the pump 7 into the nozzle of the liquid-gas jet apparatus 5 through its liquid intake.

Evacuation of the gas-vapor phase through the pipeline 3 occurs and a vacuum in the column 1 is generated when the liquid phase from the separator being used as an active liquid flows from the nozzle of the jet apparatus 5. Partial condensation of easy-condensable components of the gas-vapor phase and compression of its non-condensable gaseous components occur in the jet apparatus 5 during mixing of the active liquid with the gas-vapor phase. Then the gas-liquid mixture formed in the jet apparatus 5 proceeds to the condenser 8, where condensation of easy-condensable components of the gas-vapor phase goes on. After the condenser 8, the gas-liquid mixture proceeds to the separator 6, where the liquid phase, constituting a mixture of the active liquid and condensed components of the gas-vapor phase, is separated from the compressed gas. The gas constitutes the non-condensable components of the gas-vapor phase compressed in the jet apparatus 5. A part of the liquid phase from the separator 6 is bled as a base product and the other part of the liquid medium proceeds to the suction port of the pump 7 as the active liquid.

If required, renewal of the active liquid (for instance, in case of excessive content of contaminants) is ensured by delivery of the liquid fraction to the suction port of the pump 7 through the pipeline 4 and 4a and simultaneous discharge of an equivalent amount of the liquid phase from the separator 6 as the base product. In this variant of the plant it is rational to use as the condenser 8 a condenser-mixer furnished with an additional intake for delivery of the liquid from an external source. The pipeline 4 and 4b or discharge side of the pump 7 via line 7a (if the liquid fraction is delivered to its suction side from the pipeline 4) can be used as the mentioned external source. Delivery of the liquid fraction directly to the condenser 8 through the pipeline 4 and 4b is the more preferable mode, of the two, because it provides not only the renewal of the active liquid but also more intensive condensation of condensable components of the gas-vapor phase. Besides, the controllable mixing of the active liquid and liquid fraction enables one to optimize the process and to reduce energy losses. In case there is a relatively low or a relatively high pressure in the separator 6 or in cases where pressure fluctuations in the separator are possible it is preferable to furnish the condenser 8 with a hydro seal 10.

Industrial Applicability

The invention can be applied in technological processes or in industries, where the vacuum fractionation of liquids is required.

What is claimed is:

1. A plant for distillation of a liquid product, comprising:
    a vacuum rectification column having a first pipeline for feed of a stock product, a second pipeline for bleeding of a gas-vapor phase and a third pipeline for bleeding at least one liquid fraction, and
    a vacuum-producing device including a liquid-gas jet apparatus, a separator and a pump, wherein the vacuum-producing device further includes a condenser, and wherein a gas intake of the liquid-gas jet apparatus is connected to the second pipeline for bleeding of the gas-vapor phase, a liquid intake of the liquid-gas jet apparatus is connected to a discharge side of the pump, an outlet of the liquid-gas jet apparatus is connected to an intake of said condenser, an intake of the separator is connected to an outlet of said condenser, a liquid outlet of the separator is connected to a suction side of the pump and a gas outlet of the separator is connected to consumers of compressed gas.

2. The plant according to claim 1, wherein the third pipeline for bleeding of the liquid fraction is connected to the suction side of the pump.

3. The plant according to claim 1, wherein said condenser includes a hydro seal.

4. A plant for distillation of a distillation product, comprising:
    a vacuum rectification column having a first pipeline for feed of a stock product, a second pipeline for bleeding of a gas-vapor phase and a third pipeline for bleeding at least one liquid fraction; and
    a vacuum-producing device including a liquid-gas jet apparatus, a separator and a pump, wherein the vacuum-producing device further includes a condenser, and wherein a gas intake of the liquid-gas jet apparatus is connected to the second pipeline for bleeding of the gas-vapor phase, a liquid intake of the jet liquid-gas apparatus is connected to a discharge side of the pump, an outlet of the liquid-gas jet apparatus is connected to an intake of said condenser, an intake of the separator is connected to an outlet of said condenser, a liquid outlet of the separator is connected to a suction side of the pump, a gas outlet of the separator is connected to consumers of compressed gas, and said condenser has an additional liquid intake which is connected to the discharge side of the pump.

5. The plant according to claim 4, wherein the third pipeline for bleeding of the at least one liquid fraction is connected to the suction side of the pump.

6. The plant according to claim 4, wherein said condenser includes a hydro seal.

7. A plant for distillation of a liquid product, comprising:

a vacuum rectification column having a first pipeline for feed of a stock product, a second pipeline for bleeding of a gas-vapor phase and a third pipeline for bleeding at least one liquid fraction; and a vacuum-producing device including a liquid-gas jet apparatus, a separator and a pump, wherein the vacuum-producing device further includes a condenser, and wherein a gas intake of the liquid-gas jet apparatus is connected to the second pipeline for bleeding of the gas-vapor phase, a liquid intake of the liquid-gas jet apparatus is connected to a discharge side of the pump, an outlet of the liquid-gas jet apparatus is connected to an intake of said condenser, an intake of the separator is connected to an outlet of said condenser, a liquid outlet of the separator is connected to a suction side of the pump, a gas outlet of the separator is connected to consumers of compressed gas, and said condenser is connected to the third pipeline for bleeding of the at least one liquid fraction from the vacuum rectification column.

8. The plant according to claim 7, wherein the third pipeline for bleeding of the at least one liquid fraction is connected to the suction side of the pump.

9. The plant according to claim 7, where said condenser includes a hydro seal.

10. An installation for the distillation of a liquid product, comprising:

a rectification column for receiving a feed of a stock liquid;

a vacuum producing device coupled to the rectification column, the vacuum producing device including:

a pump having a first pipeline connected between, the pump and the rectification column for receiving the stock liquid from the rectification column:

a liquid-gas jet, the liquid-gas jet receiving an active liquid from the pump and a gas-vapor phase from the rectification column; and a condenser, the condenser connected to the liquid-gas jet and receiving the active liquid and the gas-vapor phase as a mixture from the liquid-gas jet; and a separator, the separator connected to the condenser and receiving the mixture, wherein a gas is separated from the mixture and the gas is dispensed from the separator.

11. The installation for the distillation of a liquid product according to claim 10, further comprising:

a second pipeline connecting the rectification column to said condenser, whereby the stock liquid can be added directly to said condenser.

12. The installation for the distillation of a liquid product according to claim 10, further comprising:

a line connecting the pump to said condenser, whereby the stock liquid can be pumped directly to said condenser.

13. The installation for the distillation of a liquid product according to claim 10, wherein a liquid outlet of the separator is connected to the pump.

14. The installation for the distillation of a liquid product according the claim 13, further comprising a second pipeline connecting the rectification column to said condenser, whereby the stock liquid can be added directly to said condenser.

15. The installation for the distillation of a liquid product according to claim 13, further comprising a line connecting the pump to said condenser, whereby the stock liquid can be pumped directly to said condenser.

16. The installation for the distillation of a liquid product according to claim 10, further comprising:

a hydro seal, the the hydro seal connected to said condenser for selectively isolating fluid flow into and out of said condenser.

* * * * *